US006295725B1

(12) United States Patent
King et al.

(10) Patent No.: US 6,295,725 B1
(45) Date of Patent: Oct. 2, 2001

(54) CAPPING SYSTEM AND METHOD

(75) Inventors: Ricky Lee King, Richmond; Robert F. Robinson, Mechanicsville, both of VA (US)

(73) Assignee: A-1 Security Manufacturing Corp., Richmond, VA (US)

( * ) Notice: Subject to any disclaimer, the term of this patent is extended or adjusted under 35 U.S.C. 154(b) by 0 days.

(21) Appl. No.: 09/501,504

(22) Filed: Feb. 9, 2000

(51) Int. Cl.[7] .................................................... B23P 19/00

(52) U.S. Cl. ................................ 29/804; 29/432; 83/518; 70/372; 70/431

(58) Field of Search ............................. 29/804, 432, 275, 29/281, 283, 34 R; 428/544, 577; 83/518; 70/372, 373, 431, 466

(56) References Cited

U.S. PATENT DOCUMENTS

| | | | | |
|---|---|---|---|---|
| Re. 35,518 | * | 5/1997 | Sussina | 70/369 |
| 3,176,488 | * | 4/1965 | Jacobi . | |
| 4,663,839 | * | 5/1987 | Foshee | 29/804 |
| 6,044,530 | * | 4/2000 | Room et al. | 24/336 |

* cited by examiner

*Primary Examiner*—S. Thomas Hughes
*Assistant Examiner*—John C. Hong

(57) ABSTRACT

A method and apparatus for the installation of interchangeable core lock caps that replace the prior art individual cap installation techniques with one that, with in a single highly repeatable operation, punches the caps for a plurality of pin chambers from a strip of appropriate metal and frictionally fits them into the plurality of pin chambers. The method and apparatus of the present invention reduce the possibility of misalignment of the caps with the pin chambers to virtually zero and eliminate entirely the need to handle the small caps. These advantages are achieved by: 1) placing a lock core having pin chambers in a fixture below a slanted die having apertures registered with the pin chambers; 2) placing a strip of metal in a fixed position over the die; and 3) through a mechanical plunger linked to a plurality of punches, driving the plurality of punches sequentially through the metal strip to form punched metal caps. The punched metal caps are then driven into frictional engagement with the registered pin chambers of the lock core through continued action of the plunger and punches.

7 Claims, 4 Drawing Sheets

CAPPING SYSTEM AND METHOD

FIELD OF THE INVENTION

The present invention relates to apparatus used by locksmiths for the assembly of interchangeable core locks and more particularly, to an improved such device and process that simplifies and shortens the duration of such an operation.

BACKGROUND OF THE INVENTION

In cylinder locks of conventional design, a cylindrical key-receiving plug having a first series of radially disposed channels is rotatably mounted within a cylindrical bore in a housing having a second matching series of channels known as "pin chambers". The pin chambers are in coaxial alignment with the first series of channels and open upon the bore. The opposite extremities of the pin chambers, furthest from the bore, are closed. Each pin chamber is adapted to confine a coil spring in abutment with the closed extremity, and a bottom pin that is urged toward the key-receiving plug by the spring. In some cases, one or more top pins, control pins or master pins may be positioned between the spring and the bottom pin within the pin chamber. The combination of pin lengths determines a code for opening the lock.

In certain types of cylinder locks, generally referred to as interchangeable core locks, the portion of the housing that contains the plug and pin chambers is part of an assembly known as a "core" that is slideably removable from the lock when released by a control key. The controlled removeability of the core is desired by institutions and others where a high turnover of employees necessitates a periodic change of locks to maintain security. Cores of several different codes may be kept by the institution, all keyed to a single control key but requiring different operating keys to open the individual locks. Changing of the locks requires a total recoding of the core to accept another key. In such a case, assembly of a new and different core is required.

The core further contains the cylindrical bore that houses the key receiving plug and the wall of the bore has a series of apertures axially aligned with the first series of channels and diametrically opposed thereto. The extremities of the pin chambers furthest from the bore are closed by means of friction fit discs or "caps" as they are commonly called. Assembly of the core requires insertion, in the proper order of bottom pins, master pins, control pins, top pins, springs and finally caps into the pin chambers. As all of these parts are very small, assembly can be a long and tedious operation. Insertion or application of the caps can be a particularly frustrating part of the operation. The caps are very small and, in addition to the obvious problem of inserting them into the similarly small pin chambers, they must be squarely and precisely aligned in order to achieve the appropriate friction fit. They must then somehow be driven into the pin chamber by striking with a hammer, mallet or the like to achieve the friction fit. Misalignment entails removal of the cap and reinsertion with the possibility of further misalignments before proper cap installation is achieved. This operation must be repeated for each pin chamber of which there are conventionally either six or seven.

Thus, a method and apparatus that would permit simplified, convenient and aligned installation of a plurality of friction fit caps into the pin chambers of a core all at one time would be highly valued by locksmiths.

OBJECTS OF THE INVENTION

It is therefore an object of the present invention to provide a simplified, convenient and accurate method for achieving multiple cap insertion that obviates the need for cap handling and assures proper alignment and insertion of all of the caps into all of the pin chambers of a single core on the first attempt.

It is another object of the present invention to provide an apparatus that makes the operation of installing the multiple caps into the pin chambers simple, convenient and accurate.

SUMMARY OF THE INVENTION

According to the present invention, there are provided a method and an apparatus for the installation of interchangeable core lock caps that replace the prior art individual cap installation techniques with one that, with a single mechanical stroke, punches the caps for a plurality of pin chambers from a strip of appropriate metal and frictionally fits them into the plurality of pin chambers. The method and apparatus of the present invention reduce the possibility of misalignment of the caps with the pin chambers to virtual zero and eliminate entirely the need to handle the small caps.

These advantages are achieved by: 1) placing a lock core having pin chambers loaded with the appropriate pins into a fixture, inserting springs into the core, the fixture has a slanted die with apertures registered with the pin chambers; 2) placing a strip of metal in a fixed position over the die; and 3) through a mechanical plunger linked to a plurality of punches, driving the plurality of punches sequentially through the metal strip to form punched metal caps. The punched metal caps are then driven into frictional engagement with the registered pin chambers of the lock core through continued action of the plunger.

DESCRIPTION OF THE INVENTION

Figure 1:
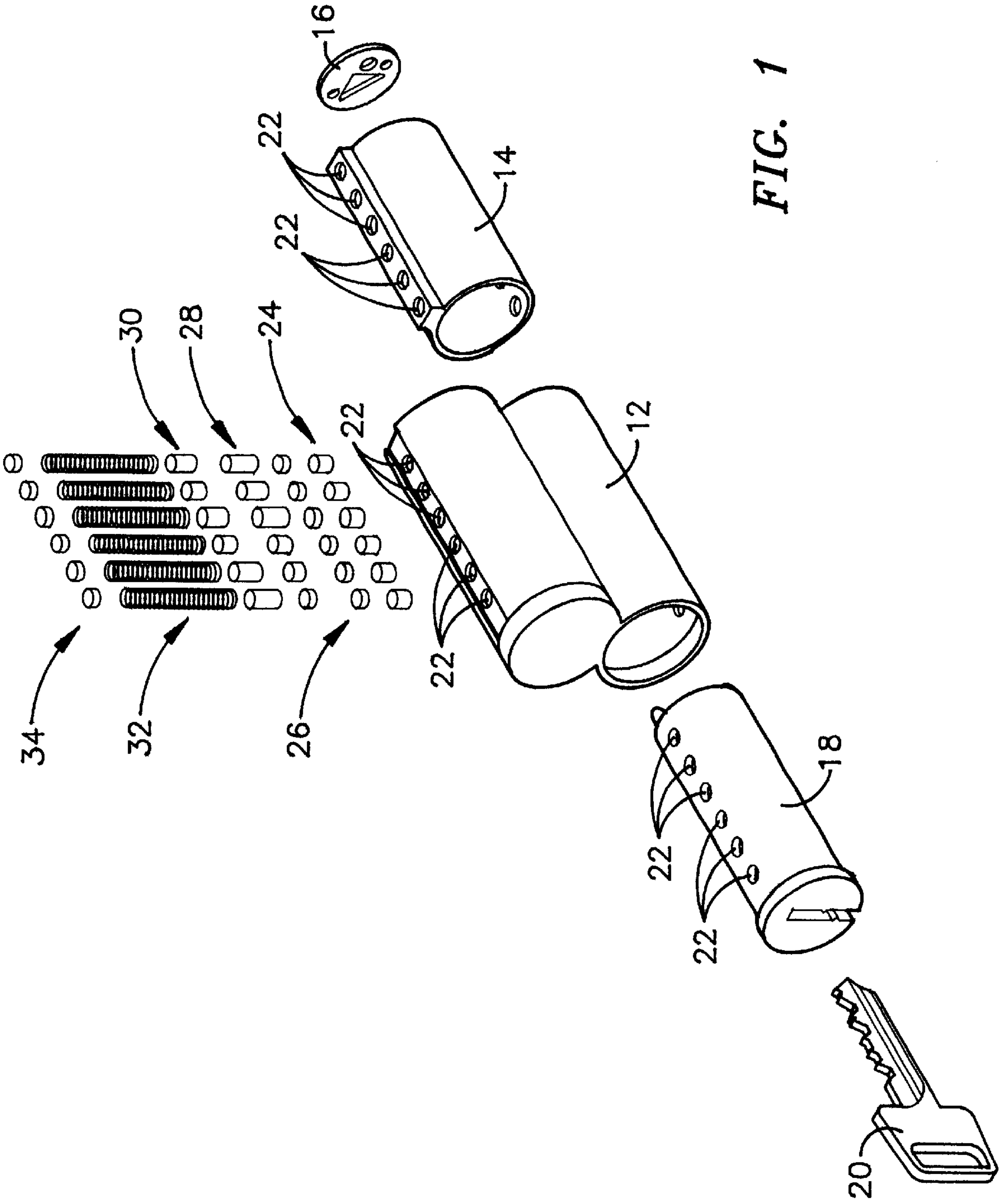
FIG. 1 is a blown apart view of an interchangeable core assembly of the type for which the method and apparatus of the present invention are designed to assemble.

As shown in FIG. 1, interchangeable core lock 10 of the type assembled in the apparatus and according to the method of the present invention comprises a shell 12, a sleeve 14 that inserts into shell 12, a key stop and plug retainer 16 at the end of shell 12, a plug 18 that inserts into sleeve 14 and receives key 20. Pin chambers 22 begin in shell 12, pass through sleeve 14 and finally enter plug 18 where they permit engagement of key 20 with the various pins inserted therethrough.

Inserted through pin chambers 22 are a variety of pins, each designed to provide a code for the various control, master or individual keys described above. As shown in FIG. 1, these comprise: bottom pins 24, master pins 26, control pins 28 and top pins 30. Inserted into pin chambers 22 on top of these pins are springs 32 that force the pin stack against the inserted key and finally caps 34 that are frictionally fit into pin chambers 22 and retain springs 32 and the various pins in chambers 22. It is caps 34 whose insertion and frictional fitting has been discussed herein above and whose installation is the objective of the present invention.

Figure 2:
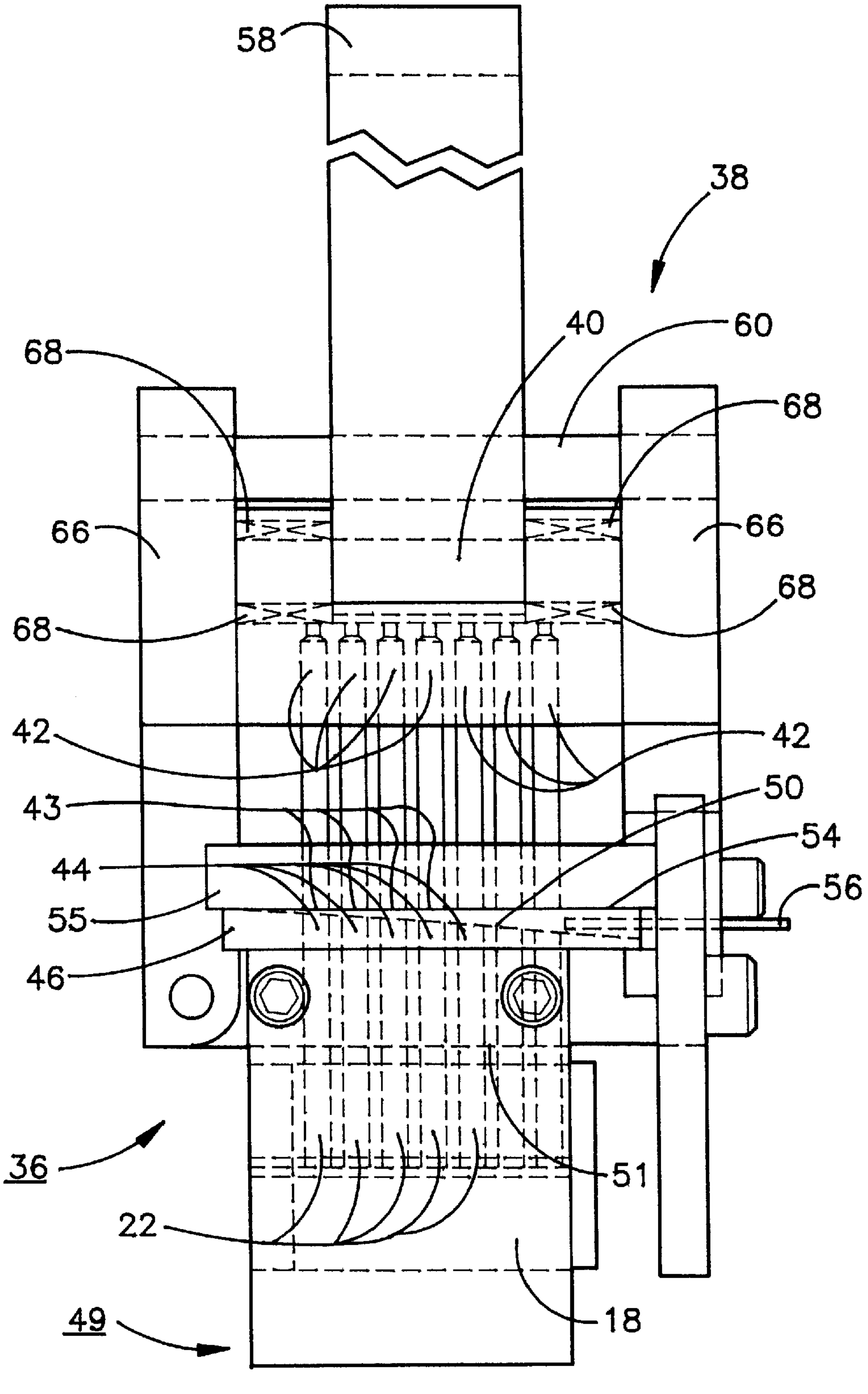
FIG. 2 is a front cut away view of the core assembly apparatus of the present invention.
Figure 3:
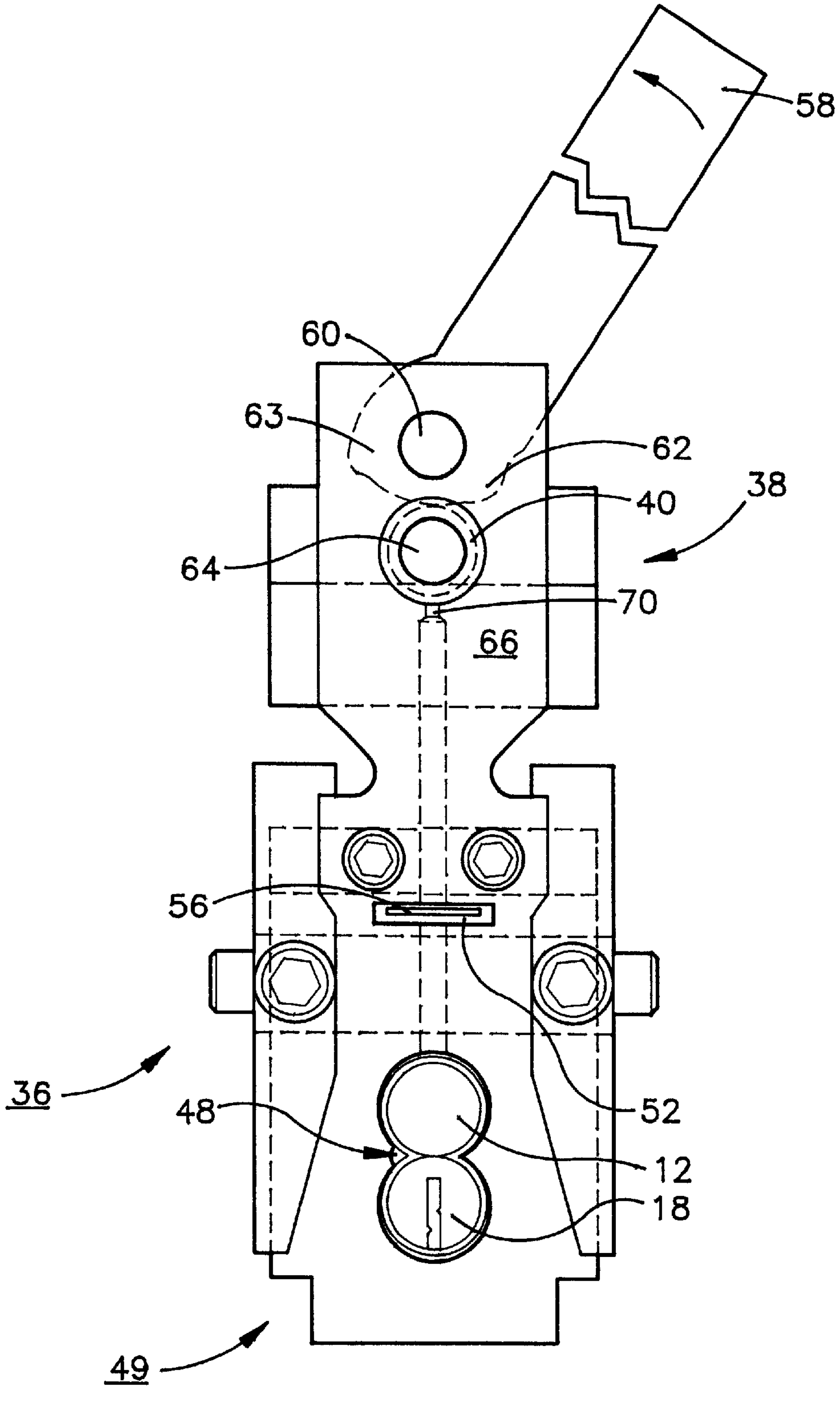
FIG. 3 is a side cut away view of the core assembly apparatus of the present invention.

Referring now to FIGS. 2 and 3, the apparatus 36 of the present invention comprises a plunger mechanism 38 mechanically linked via, for example roll 40, to a plurality of punches 42 that lie in registration with the apertures 44 in die plate 46. Apertures 44 in turn, lie in registration with pin chambers 22 in plug 18 and shell 12 of lock core 48 that is secured in interchangeable lock core gripping device 49. Gripping device 49 comprises an aperture or chamber of a size and shape to receive an interchangeable lock core 48 and, when interchangeable core 48 is fully inserted into gripping device 49, hold pin chambers 22 in registration with die plate apertures 44. Upper surface 50 of die plate 46 is slanted for reasons that will be explained below.

As shown in FIGS. 2 and 3, a slot 52 is provided between bottom 54 of punch guide 55 and upper surface 50 for the insertion of a strip of appropriate metal 56 to be inserted therebetween.

In the embodiment depicted in FIGS. 2 and 3, depression of punches 42 is obtained by the application of pressure to cam lever 58 that rotates about axle 60 as pressure is applied. Upon such rotation, eccentric portion 62 of cam lever 58 pushes against roll 40 mounted in frame 66 on needle bearings 68 causing downward movement of punches 42 as cam lever 58 rotates against roll 40 on the surface thereof which contacts that opposite eccentric portion 62. This downward movement of punches 42 causes their punch tips 43 to first contact and then penetrate metal strip 56. Because of the slanted arrangement of die plate surface 50 penetration of metal strip 56 occurs in a sequential fashion with preferably no more than three of tips 43 penetrating metal strip 56 at any point in time, thereby reducing the amount of pressure that must be applied via cam lever 58 to achieve penetration of metal strip 56 by all of tips 43 of punches 42. The angle of surface 50 is preferably between about 2° and 10° and preferably the angle is about 4°. As punches 42 continue their downward travel through reversal of the direction of cam lever 58 and the action of eccentric portion 63, the portions of metal strip 56 punched out by tips 43 in the first rotation of cam lever 58 are forced through die plate apertures 44 and into pin chambers 22. Because of the size and shape of punch tips 43 these portions of metal are frictionally fit into pin chambers 22 at the downward limit of travel of punches 42.

As will be apparent to the skilled artisan, any number of mechanical linkages or arrangements can be used to force punches 42 through strip 56 and into die plate apertures 44 and pin chambers 22, and the present invention should not be considered limited in any way to the mechanical expedient of a cam lever 58 as depicted in FIGS. 2 and 3. For example, an arbor press could be used as the means for applying the required pressure while punches 42 were mounted to a plate that was depressed by actuation of the arbor press. Any and all such modifications that constitute mechanical expedients to apply pressure to a set of uniform punches should be considered mechanical equivalents. Automation of this apparatus is also contemplated.

Design of punches 42 to obtain the proper size and shape of cap 34 is well within the skill of the art and will not be described in detail here. Apertures 44 in die plate 46 provide the proper sizing of caps 34 as they are punched from metal strip 56 and then frictionally inserted into pin chambers 22. Preferably, apertures 44 are from about 0.116 to about 0.120 inches in diameter.

Strip 56 may nominally be of any suitable material; however, brass is conventionally the material of choice because of its malleability and corrosion resistance. Annealed stainless steel could also be used as strip 56. Similarly, while the size of strip 56 is not critical to the successful practice of the present invention, the use of a strip 56 between about ⅜ and ⅝ inches wide is specifically preferred. At this width, the strip may be used twice by extracting caps 34 from one side thereof on one pass and then inverting strip 56 and extracting a second set of caps therefrom on a second pass (see for example, FIG. 4). Generally, metal strip 56 has a thickness of between about 0.012" and 0.030" depending upon the hardness of the metal used for strip 56. Conventionally, a half-bard brass is used at a thickness of from about 0.010 to 0.025". The dimensions of slot 52 should be on the order of about 0.01" to about 0.02" larger than the width dimension of strip 56. The height of slot 52 can be of any dimension that allows proper insertion of metal strip 56 and permits the required penetration of punch tips 43 into pin chambers 22, and, according to preferred embodiments, alignment as described below.

Similarly, although metal strip 56 is depicted as being a short strip that is inserted into slot 52 at the time of use, it could also constitute a coiled strip with a payoff and a takeup on either side of slot 52 such that, as each lock core is assembled, the continuous strip 56 is advanced an appropriate interval to provide a new area for formation of caps 34 by punching of metal strip 56 by punches 42.

According to a series of alternative preferred embodiments of metal strip 56 depicted in FIGS. 4 through 7, various means of locating, i.e. self aligning metal strip 56 in slot 52 can be provided. In each of the embodiments depicted in FIGS. 4–7 metal strip 56 is of sufficient width as described elsewhere herein to provide at least two sets of caps 34 as shown in phantom in FIG. 4. This is accomplished by inserting metal strip 56 into slot 52, activating apparatus 36 to form and insert caps **34*a* as previously described and then removing metal strip 56 and rotating it about its narrow axis, reinserting it into slot 52 and activating apparatus 36 to form and insert a second set of caps 34*b*. Metal strip 56 is preferably of such a length that it can then be rotated about its long axis and the just described process repeated to form and insert sets of caps 34*c* and 34*d* by further rotation and activation of apparatus 36**.

Figure 4:
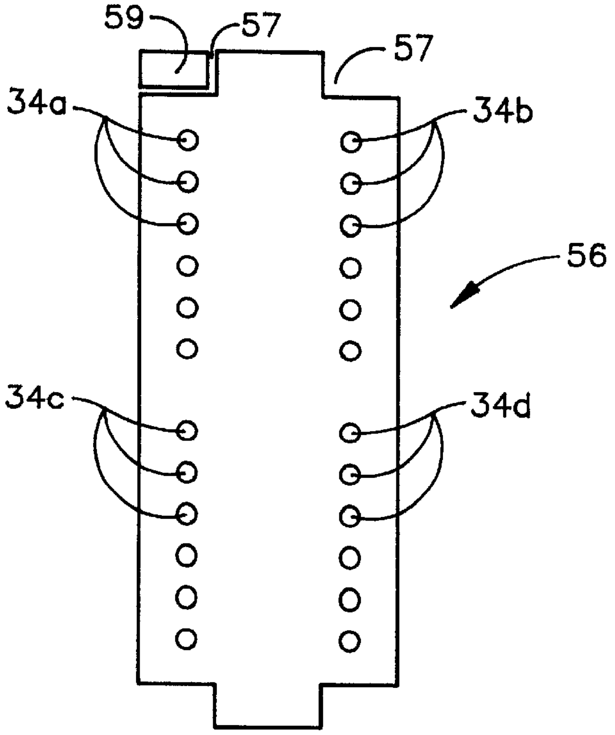
FIG. 4 is a plan view of one embodiment of the metal strip of the present invention.

As shown in FIG. 4, the innermost end 61 of metal strip 56 can be provided with geometrically modified corners (in the case depicted in FIG. 4 rectangular cutouts 57) that bear against a locator pin(s) or the like 59 located at the rear or innermost portion of slot 52. As will be clear to the skilled artisan, cutouts 57 can be of any geometric shape such as circular, triangular, etc. so long as locator pin 59 is of a mating configuration.

Figure 5:
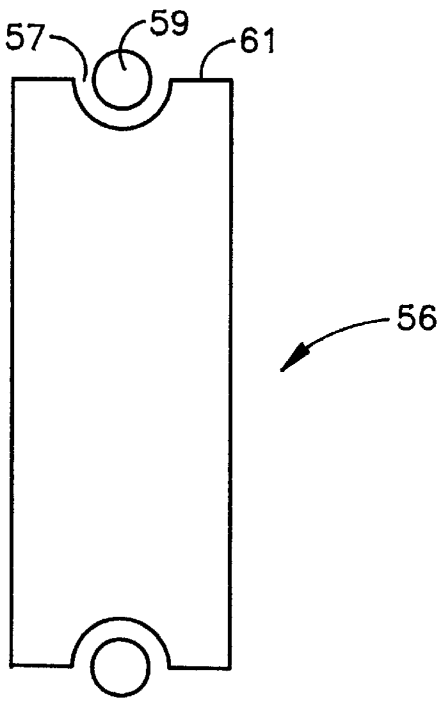
FIG. 5 is a plan view of another embodiment of the metal strip of the present invention.

As shown in FIG. 5 the geometric cutout 57 can be moved to the center of innermost end 61 of metal strip 56 and locator pin 59 likewise relocated to the center rear area of slot 52.

Figure 6:
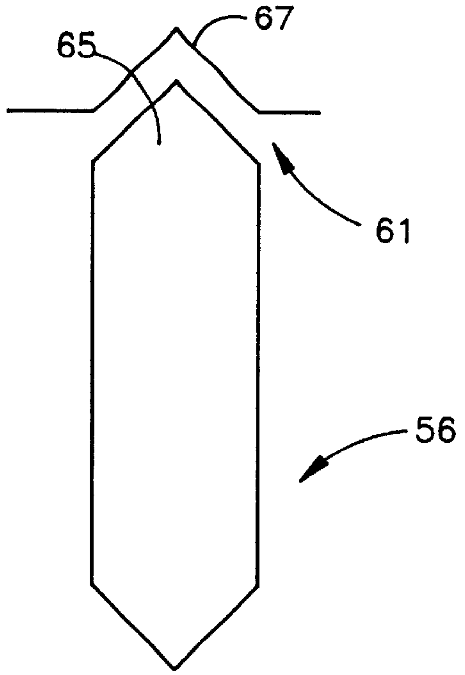
FIG. 6 is a plan view of yet a further alternative embodiment of the metal strip of the present invention.

FIG. 6 depicts yet another alternative embodiment of metal strip 56 wherein the entire face of innermost end 61 of metal strip 56 is modified to a geometric shape 65 that engages a mating configuration 67 in the rear, innermost portion of slot 52. In this case a triangular cut is depicted, but a round cut would be similarly useful and operative.

Figure 7:
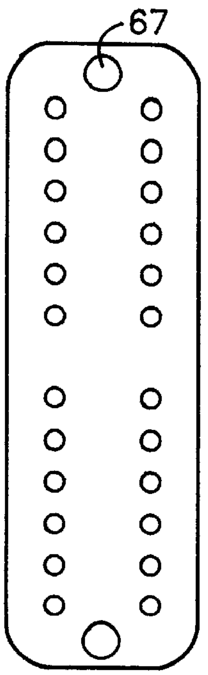
FIG. 7 is a plan view of yet a fourth alternative embodiment of the metal strip of the present invention.

Finally, as depicted in FIG. 7, metal strip 56 can be provided with an aperture 69 that engages a locator pin that forms a part of the punch assembly and descends for engagement with aperture 69 simultaneously with activation of punches 42, but serves only to engage aperture 69 when metal strip 56 is properly registered, and inhibits downward movement of punches 42 when aperture 69 is not properly engaged.

In use, the above-described apparatus is used to insert caps as follows: 1) an interchangeable lock core 48 including the appropriate bottom pins, master pins, control pins and top pins or any combination thereof is inserted into the core gripping device 49 and oriented such that pin chambers 22 are aligned with die apertures 44. The appropriate springs are then inserted into pin chambers 22. According to a preferred embodiment, the design of core gripper 49 is such that upon pushing core 48 home therein, such alignment is achieved. An appropriate metal strip 56, as described hereinabove, is inserted into slot 52. Cam lever 58 is then first activated by rotation about axle 60 in the direction of first eccentric portion 62 driving tips 43 of punches 42 sequentially through metal strip 56 forming the caps 34. Counter rotation of cam lever 58 on axle 60 in the direction of second eccentric portion 63 pushes caps 34 (not shown in FIGS. 2 or 3) through die apertures 44 and into pin chambers 22 where they are frictionally secured all at one time. Lock core 48 can then be removed from gripping device 49 and is ready for lock installation.

There has thus been described, a novel apparatus and method for obtaining the simplified and accurate installation of a plurality of caps into a lock core in a single highly repeatable operation. This significantly shortens the interchangeable lock core assembly process and provides a highly repeatable and a considerably less frustrating operation.

As the invention has been described, it will be apparent to those skilled in the art that the same may be varied in many ways without departing from the spirit and scope of the invention. Any and all such modifications are intended to be included within the scope of the appended claims.

What is claimed is:

1. A lock core cap installation device capable of installing a plurality of caps in a single repeatable operation comprising:

A) a lock core gripping device that receives and retains an interchangeable lock core having a plurality of pin chambers;

B) a die having a slanted upper surface, a lower surface and a plurality of die apertures that penetrate said die from said upper surface to said lower surface and lie in registration with said pin apertures when said interchangeable lock core is retained in said gripping device;

C) a plurality of punches that lie in registration with said die apertures, are of a length to penetrate said die apertures and enter said pin chambers and of a size to form a plurality of caps of appropriate size as they penetrate a metal strip retained between said upper die surface and said punches and penetrate said die apertures and frictionally fit said caps in said pin chambers;

D) a mechanism for driving said plurality of punches sequentially through said die apertures and into said pin chambers.

2. The lock core installation device of claim 1 further including a slot between said plurality of punches and said slanted upper surface for receipt and retention of the metal strip that is punched when said plurality of punches are driven sequentially through the metal strip and into the die apertures.

3. The lock core cap installation device of claim 2 wherein said upper surface is slanted at an angle of between about 2° and about 10°.

4. The lock core cap installation device of claim 3 wherein said angle is about 4°.

5. The lock core cap installation device of claim 3 wherein said die apertures have a diameter of between about 0.116 and about 0.120 inches.

6. The lock core cap installation device of claim 2 wherein said slot has a width ranging from about 3/8" to about 5/8".

7. The lock core cap installation device of claim 2 wherein said mechanism for driving said plurality of punches sequentially through said die apertures and into said pin chambers comprises a cam lever rotatable about an axle and having a pair of eccentric portions riding upon a roll having an arcuate surface, said roll slideably mounted in a frame, said punches engage said surface at a point thereon diametrically opposite from that engaged by said eccentric portion and rotation of said cam lever about said axle causes said roll to drive said punches through said die apertures and said metal strip forming said caps and reversal of said cam lever drives said caps into said pin chambers.

* * * * *